US011192198B2

(12) United States Patent
Teramoto et al.

(10) Patent No.: US 11,192,198 B2
(45) Date of Patent: Dec. 7, 2021

(54) SHAVING PROCESSING METHOD AND SHAVING PROCESSING APPARATUS FOR GEAR

(71) Applicant: MAZDA MOTOR CORPORATION, Hiroshima (JP)

(72) Inventors: Yoshihiro Teramoto, Aki-gun (JP); Ryoichi Ueno, Aki-gun (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 0 days.

(21) Appl. No.: 16/953,053

(22) Filed: Nov. 19, 2020

(65) Prior Publication Data
US 2021/0187643 A1 Jun. 24, 2021

(30) Foreign Application Priority Data
Dec. 20, 2019 (JP) .............................. JP2019-230514

(51) Int. Cl.
*B23F 19/06* (2006.01)
*B23F 5/22* (2006.01)
(Continued)

(52) U.S. Cl.
CPC .............. *B23F 19/06* (2013.01); *B23F 5/202* (2013.01); *B23F 5/22* (2013.01); *B23F 19/007* (2013.01);
(Continued)

(58) Field of Classification Search
CPC ...... B23F 19/06; B23F 19/007; B23F 19/102; B23F 5/163; Y10T 409/105724;
(Continued)

(56) References Cited

U.S. PATENT DOCUMENTS 3,188,915 A * 6/1965 Hurth .................. B23F 5/12
409/33
4,190,387 A * 2/1980 Loos .................... B23F 19/06
409/33
(Continued)

FOREIGN PATENT DOCUMENTS

GB 304137 A * 8/1929
JP 02-262913 A * 10/1990
(Continued)

OTHER PUBLICATIONS

Machine Translation of JP 02-262913, which JP '913 was published Oct. 1990.*
(Continued)

*Primary Examiner* — Erica E Cadugan
(74) *Attorney, Agent, or Firm* — Studebaker & Brackett PC (57) ABSTRACT

A shaving processing method and apparatus for a gear are provided which reduce a load at the time of processing a tooth surface, thereby reducing a transmission error of the gear. Embodiments include a method for finishing the tooth surface of the gear in a state where the gear and a shaving cutter are engaged with each other and the shaving cutter is rotated. The gear has a pair of end surfaces facing each other in the tooth width direction. A first shaving step of processing the tooth surface is performed so that a processing region gradually expands from one end surface of the pair of end surfaces toward the other end surface, and a second shaving step of processing the tooth surface is performed so that a processing region gradually expands from the other end surface of the pair of end surfaces toward the one end surface.

8 Claims, 9 Drawing Sheets

(51) Int. Cl.
*B23F 5/20* (2006.01)
*B23F 19/00* (2006.01)

(52) U.S. Cl.
CPC ............... *Y10T 409/104929* (2015.01); *Y10T 409/105565* (2015.01); *Y10T 409/107632* (2015.01)

(58) Field of Classification Search
CPC . Y10T 409/105088; Y10T 409/104929; Y10T 409/105247; Y10T 409/107632; Y10T 409/10–109699
USPC ...................................................... 409/1–62
See application file for complete search history.

(56) References Cited

U.S. PATENT DOCUMENTS 4,545,708 A * 10/1985 Buschhoff .............. B21H 5/022
409/32
4,947,590 A * 8/1990 Schapp ................ B23F 19/007
409/32

FOREIGN PATENT DOCUMENTS

JP          04-365512 A  * 12/1992
JP          2004154873 A    6/2004

OTHER PUBLICATIONS

Machine Translation of JP 04-365512, which JP '512 was published Dec. 1992.*

* cited by examiner

SHAVING PROCESSING METHOD AND SHAVING PROCESSING APPARATUS FOR GEAR

TECHNICAL FIELD

The present disclosure relates to a shaving processing method and a shaving processing apparatus for a gear.

BACKGROUND ART

Japanese Patent Laid-Open No. 2004-154873 discloses a shaving processing method for finishing a tooth surface of a gear by using a shaving cutter. In this shaving processing method, so that an axis of the gear and an axis of the shaving cutter intersect with each other at a previously determined intersection angle, the gear and the shaving cutter are disposed in a state of being engaged with each other, and the shaving cutter is rotated, thereby performing finishing processing of the tooth surface. However, when at the time of finishing processing, a previously determined cut amount of the tooth surface is all cut in one-time processing, the processing load increases, thus easily causing an error. This error causes a transmission error in a rotational angle of the engaged gear, and an increased transmission error may cause vibration and noise.

SUMMARY

The disclosure of the present application provides a shaving processing method and a shaving processing apparatus for a gear which reduce a processing load at the time of processing a tooth surface, and thereby reduce a transmission error of the gear.

A shaving processing method according to an embodiment of the present disclosure is a shaving processing method for finishing a tooth surface of a gear in a state where the gear and a shaving cutter are engaged with each other and the shaving cutter is rotated, the gear comprising a pair of end surfaces facing each other in a tooth width direction. The disclosed method has a first shaving step of processing the tooth surface so that a processing region gradually expands from one end surface of the pair of end surfaces toward the other end surface, and a second shaving step of processing the tooth surface so that a processing region gradually expands from the other end surface of the pair of end surfaces toward the one end surface.

Furthermore, a shaving processing apparatus according to an embodiment of the present disclosure is a shaving processing apparatus for finishing a tooth surface of a gear in a state where the gear and a shaving cutter are engaged with each other and the shaving cutter is rotated, the gear comprising a pair of end surfaces facing each other in a tooth width direction. The disclosed apparatus includes an intersection angle adjusting mechanism which sets an intersection angle between a central axis of the gear and a central axis of the shaving cutter to a first intersection angle and to a second intersection angle corresponding to a finishing condition of the tooth surface.

According to the present disclosure, finishing processing of the gear is divided into the first shaving step and the second shaving step to be performed. The first shaving step and the second shaving step both process the tooth surface to gradually expand the processing regions. At this time, a processing load gently increases, so that the entire processing load is reduced. As a result, an error is suppressed, and a gear with a reduced transmission error can be obtained.

DETAILED DESCRIPTION

Hereinafter, an embodiment of a shaving processing apparatus and shaving processing method according to the present disclosure will be described with reference to the attached drawings. Note that the shaving processing apparatus and shaving processing method of the embodiment described below use a plunge cut shaving method in which a shaving cutter is caused to approach a workpiece gear to thereby process the workpiece gear, but are not limited to this.

Configuration of Shaving Processing Apparatus

Figure 1:
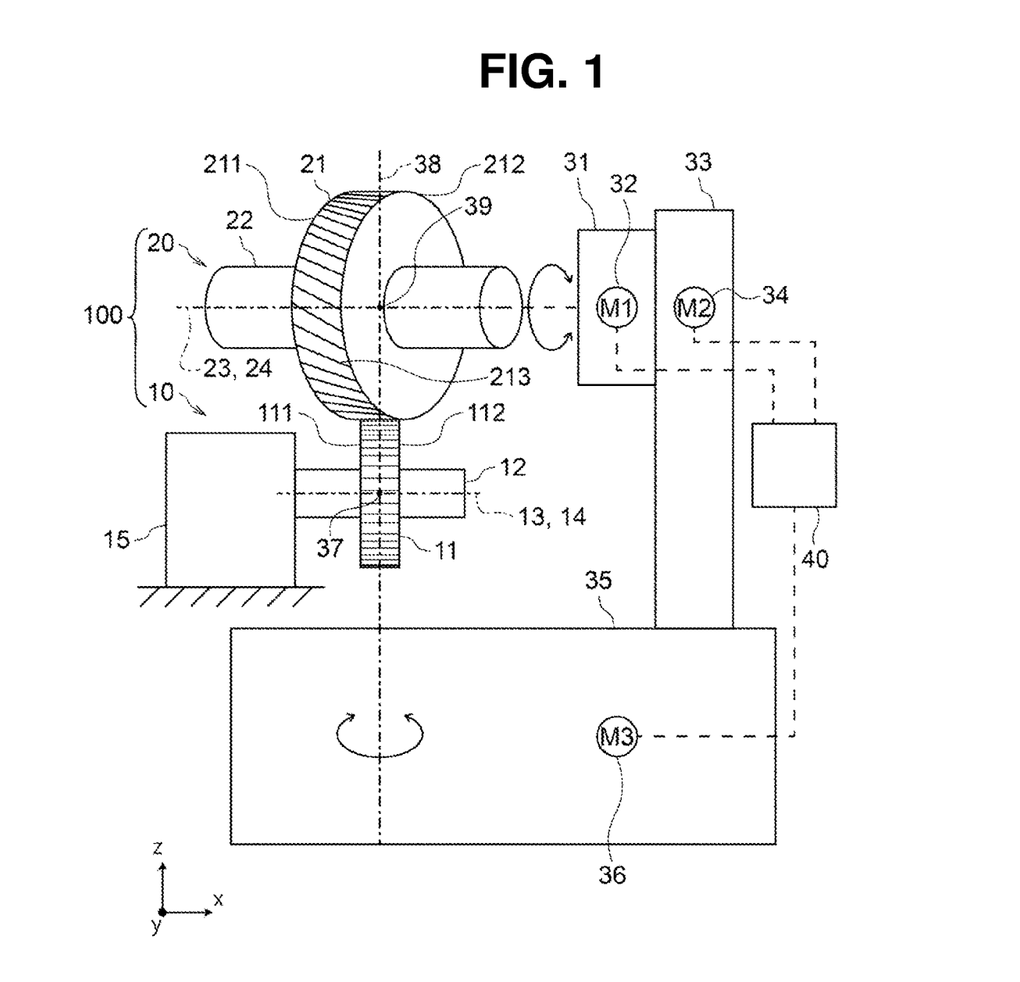
FIG. 1 is a schematic view of a shaving processing apparatus according to an embodiment of the present disclosure.

FIG. 1 is a schematic view of the shaving processing apparatus according to this embodiment. The size of the illustrated apparatus and the size and shape of each of portions constituting the apparatus are shown in an exaggerated manner and differ from the actual ones.

A shaving processing apparatus (hereinafter referred to as a "processing apparatus") 100 shown in FIG. 1 has a workpiece gear supporting mechanism 10. The workpiece gear supporting mechanism 10 has a gear supporting shaft 12 detachably supporting a workpiece gear 11. In this embodiment, the gear supporting shaft 12 extends in the left-right direction of the drawing. A central axis 13 of the workpiece gear 11 and a central axis 14 of the gear supporting shaft 12 coincide with each other in a state where the workpiece gear 11 is supported by the gear supporting shaft 12. Hereinafter, the direction of the central axis 14 of the gear supporting shaft 12 is referred to as an "x direction"; the front-back direction of the drawing which is orthogonal to the x direction, a "y direction"; the up-down direction of the drawing which is orthogonal to the x direction and the y direction, a "z direction."

Workpiece Gear Supporting Mechanism

The gear supporting shaft 12 is supported by a fixed base 15. The gear supporting shaft 12 may be rotatably fixed to the fixed base 15 or may be non-rotatably fixed to the fixed base 15. When the gear supporting shaft 12 is rotatably fixed to the fixed base 15, the workpiece gear 11 may be rotatable or non-rotatable with respect to the gear supporting shaft 12. When the gear supporting shaft 12 is non-rotatably fixed to the fixed base 15, the workpiece gear 11 is rotatable with respect to the gear supporting shaft 12.

Cutter Driving Unit

The processing apparatus 100 also has a cutter driving unit 20. The cutter driving unit 20 has a cutter supporting shaft 22 detachably supporting a shaving cutter (hereinafter referred to as a "cutter") 21. A central axis 23 of the cutter 21 and a central axis 24 of the cutter supporting shaft 22 coincide with each other in a state where the cutter 21 is supported by the cutter supporting shaft 22. The cutter supporting shaft 22 is held so that the central axis 23 of the cutter 21 and the central axis 24 of the cutter supporting shaft 22 are positioned on a surface parallel to an xy plane including the x direction and the y direction.

Cutter Rotating Mechanism

The cutter supporting shaft 22 is supported by a cutter rotating mechanism 31. The cutter rotating mechanism 31 has a cutter rotating motor 32, the cutter rotating motor 32 is drivingly connected to the cutter supporting shaft 22, and the cutter supporting shaft 22 is configured so as to rotate based on driving of the cutter rotating motor 32.

Cutter Lifting and Lowering Mechanism

The cutter rotating mechanism 31 is supported so as to be capable of lifting and lowering, by a cutter lifting and lowering mechanism 33 which moves or lifts and lowers the cutter rotating mechanism 31 in the z direction. In this embodiment, the cutter lifting and lowering mechanism 33 includes a cutter lifting and lowering motor 34, a rotational axis (not illustrated) of the cutter lifting and lowering motor 34 is drivingly connected to the cutter rotating mechanism 31, and the cutter rotating mechanism 31 is configured to move or lift and lower in the z direction based on driving of the cutter lifting and lowering motor 34.

Cutter Turning Mechanism

The cutter lifting and lowering mechanism 33 is supported by a cutter turning mechanism (intersection angle adjusting mechanism) 35. In this embodiment, the cutter turning mechanism 35 includes a cutter turning motor 36, and the cutter rotating mechanism 31 and the cutter lifting and lowering mechanism 33 are configured so as to integrally turn and move based on driving of the cutter turning motor 36 in a state where a center 39 of the cutter 21 is positioned at a reference line 38 in the z direction which passes through a center 37 of the workpiece gear 11 supported by the gear supporting shaft 12 of the workpiece gear supporting mechanism 10.

The cutter rotating motor 32, the cutter lifting and lowering motor 34, and the cutter turning motor 36 are rotatable in the forward and reverse directions. Alternatively, a mechanism which reverses the rotational direction may be provided in a mechanism which transmits the driving of each of the motors so that this reversing mechanism switches the rotational direction and moving direction (lifting and lowering direction and turning direction) of the cutter.

It is preferable that the cutter lifting and lowering motor 34 and the cutter turning motor 36 use a stepping motor to be able to strictly adjust a lifting and lowering amount and a turning amount (turning angle).

Controller

The cutter rotating motor 32, the cutter lifting and lowering motor 34, and the cutter turning motor 36 are connected to a controller 40 and are configured so that, during shaving processing, the driving is controlled based on an instruction output from the controller 40. Specifically, a program necessary for performing shaving processing described below is stored in the controller 40, and based on this program, the driving of the motors 32, 34, and 36 is controlled.

Shaving Processing

An embodiment will be described in which the processing apparatus 100 including the above configurations is used and a tooth surface of the workpiece gear 11 is subject to shaving processing.

Workpiece Gear

Figure 4:
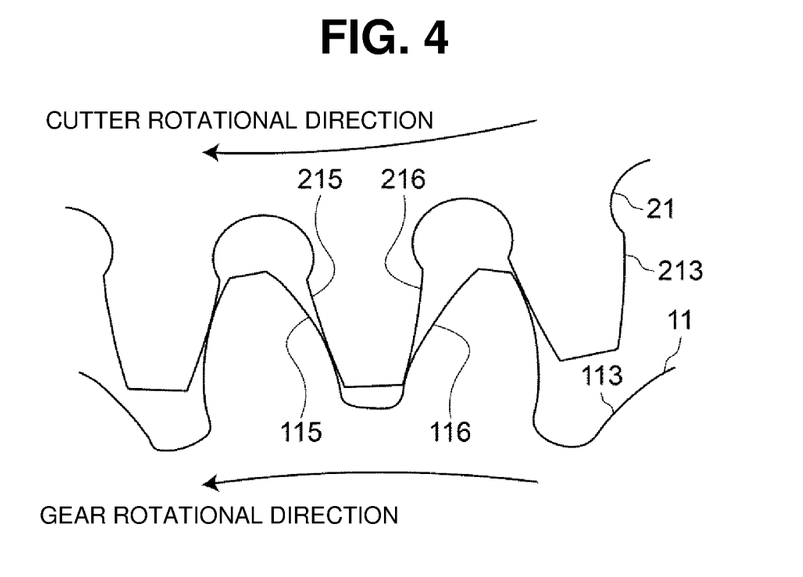
FIG. 4 is a schematic view of a state where the shaving cutter and the gear are engaged with each other in the shaving processing method of FIG. 3.
Figure 5:
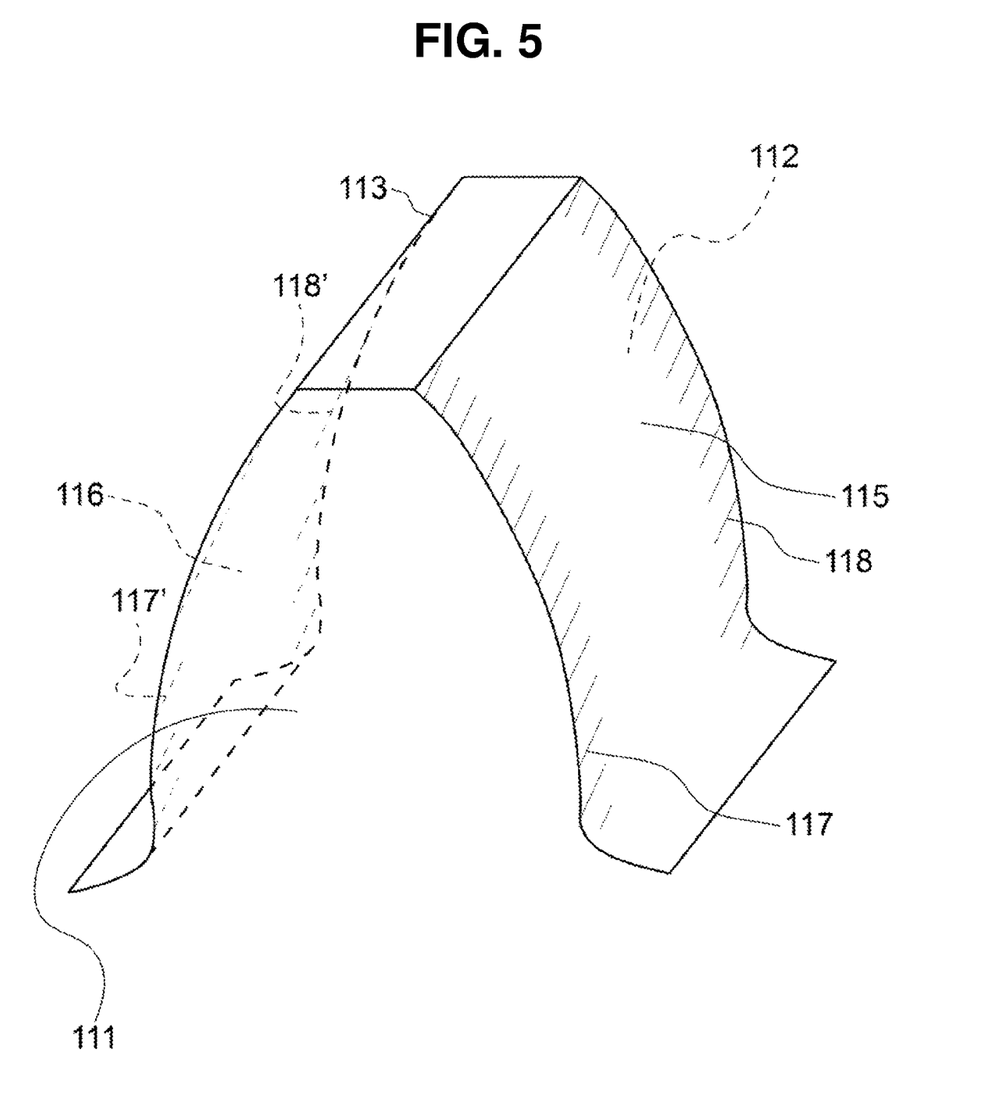
FIG. 5 is a perspective view of a tooth surface of the gear shown in FIG. 4.

In this embodiment, the workpiece gear 11 is a spur gear and has an inner peripheral surface and an outer peripheral surface which are centered on the central axis 13, and a pair of end surfaces 111 and 112 facing to each other in the direction of the central axis 13 (tooth width direction), and on the outer peripheral surface, a tooth (workpiece tooth) 113 (see FIG. 4) is formed which extends parallel to the central axis 13 at a constant interval in the peripheral direction.

In a state where the center 37 of the workpiece gear 11 coincides with the reference line 38, the workpiece gear 11 is detachably fixed to the gear supporting shaft 12 so as to be rotatable with respect to the gear supporting shaft 12 or rotatable together with the gear supporting shaft 12.

Cutter

Figure 2A:
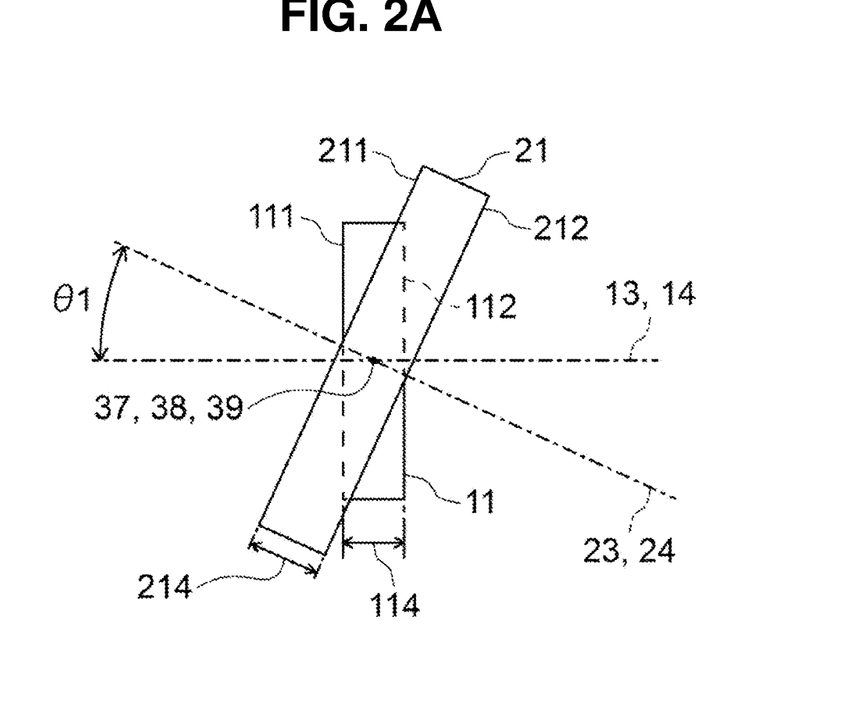
FIGS. 2A and 2B are plan views in which a shaving cutter and gear of the shaving processing apparatus shown in FIG. 1 are viewed from above.
Figure 2B:
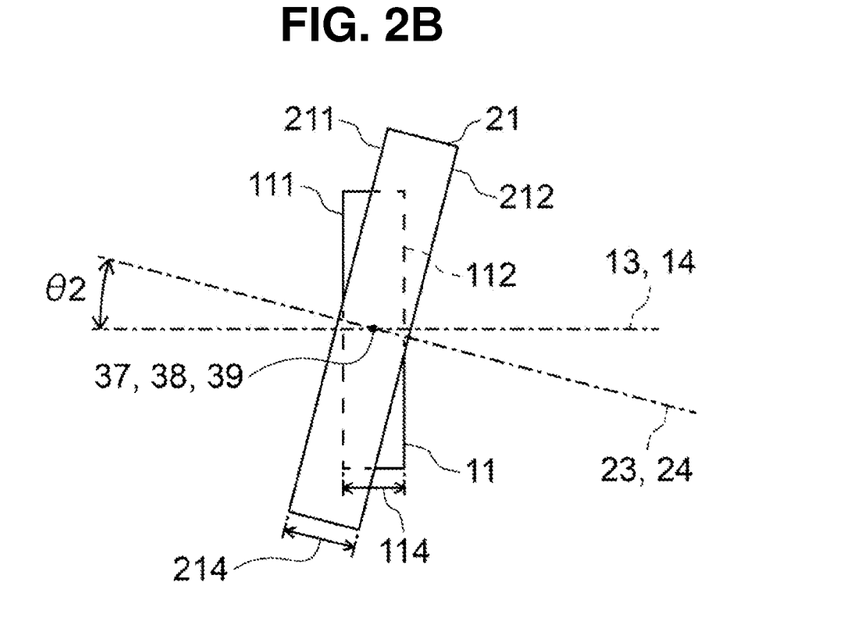

The cutter 21 has an inner peripheral surface and an outer peripheral surface which are centered on the central axis 23, and a pair of end surfaces 211 and 212 facing each other and orthogonal to the central axis 23, and on the outer peripheral surface, a cutting tooth 213 is formed which extends in a helical shape at a constant interval in the peripheral direction (i.e., the cutter 21 of this embodiment is of a helical gear type). As shown in FIGS. 2A-2B, a length 214 (substantially corresponding to an interval of the pair of end surfaces facing each other) of the cutting tooth 213 which relates to the direction of the central axis 23 of the cutter 21 is sufficiently larger than a length 114 of the workpiece tooth 113 which relates to the direction of the central axis 13 of the workpiece gear 11 and is determined so that, in a shaving processing state where the central axis 23 of the cutter 21 is inclined at a predetermined angle (intersection angles θ1 and θ2 described later) with respect to the central axis 13 of the workpiece gear 11 so as to intersect therewith, the cutting tooth 213 of the cutter 21 is engaged with the corresponding workpiece tooth 113 of the workpiece gear 11 over the full length of the workpiece tooth 113 (see FIG. 2).

In a state where the center 39 of the cutter 21 coincides with the reference line 38, the cutter 21 is detachably fixed to the cutter supporting shaft 22.

Although in FIG. 1, the workpiece gear 11 and the cutter 21 are represented in a state of being engaged with each other, in a state before processing, the workpiece gear 11 and the cutter 21 are spaced apart from each other in the z direction. A position of the cutter 21 at this time is an "initial position" of the cutter 21 (a position P0 in FIG. 6A), and shaving processing described below starts from this initial position.

First Shaving Step

The shaving processing is schematically divided into a first shaving step and a second shaving step. In the first shaving step, the controller 40 drives the cutter turning motor 36 to set an intersection angle (an intersection angle as viewed from the z direction) of the central axis 24 of the cutter supporting shaft 22 with respect to the central axis 14 of the gear supporting shaft 12 to the first intersection angle θ1 (see FIG. 2A). The first intersection angle θ1 is larger than an intersection angle (second intersection angle θ2 shown in FIG. 2B) corresponding to a finishing condition for obtaining a tooth surface shape of the workpiece gear 11 which can be finally obtained.

The controller 40 next drives the cutter lifting and lowering motor 34 for a predetermined time (from a time T0 to a time T1 in FIG. 6A) to cause the cutting tooth 213 of the cutter 21 to approach a tooth surface 115 of the workpiece gear 11 (a cutter position P1 after the approach).

Subsequently, the controller 40, while driving the cutter rotating motor 32 and thereby rotating the cutter 21, drives the cutter lifting and lowering motor 34 to cause the cutting tooth 213 of the cutter 21 to abut against the tooth surface 115 of the workpiece gear 11, thereby shaving the tooth surface 115 of the workpiece gear 11. A time at which the cutter 21 contacts the workpiece gear 11 is a time T12 in FIG. 6B. As shown in FIG. 6B, as the shaving of the cutter 21 increases, a load applied to the cutter 21 gradually increases. This load applied to the cutter 21 becomes constant immediately before the shaving of the cutter 21 reaches a predetermined amount (a cutter position P2 in FIG. 6A). When the predetermined amount of the shaving ends, the controller 40 stops the driving of the cutter lifting and lowering motor 34 (a time T2 and the cutter position P2 in FIG. 6A).

As described above, in the first shaving step, the intersection angle of the central axis 24 of the cutter supporting shaft 22 with respect to the central axis 14 of the gear supporting shaft 12 is set to the first intersection angle θ1 which is larger than the second intersection angle θ2 corresponding to a final shape of the tooth surface 115.

Figure 3:
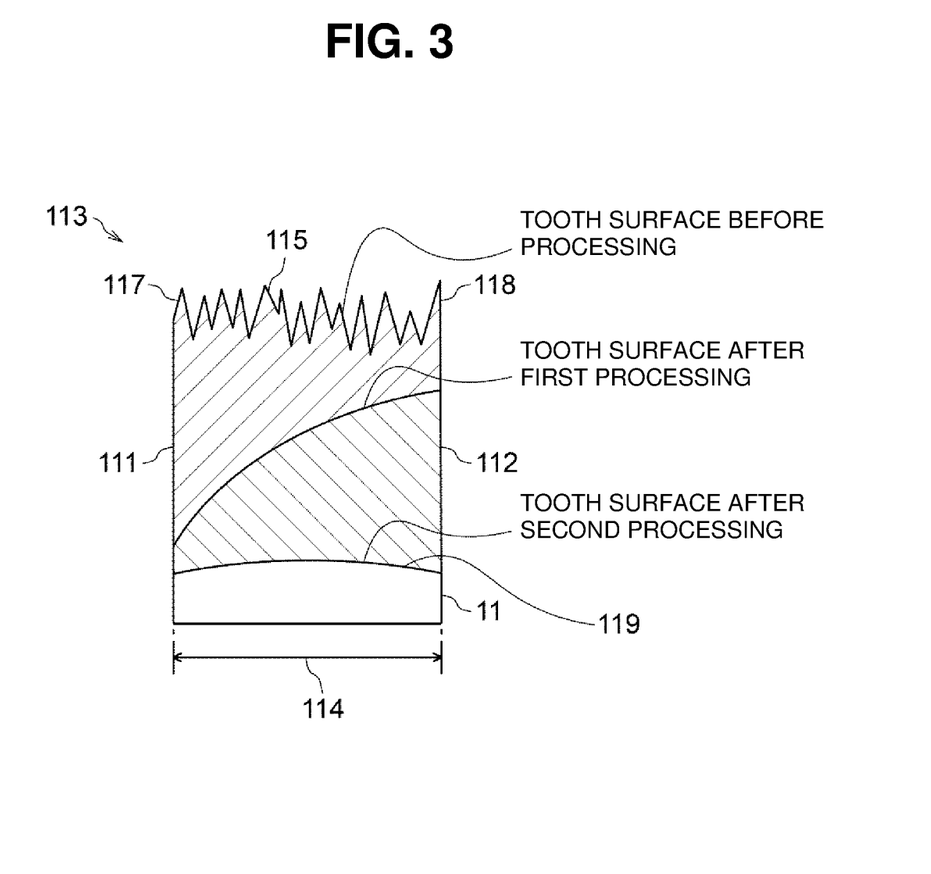
FIG. 3 is a schematic view describing a shaving processing method performed by the shaving processing apparatus shown in FIG. 1.

Accordingly, as shown in FIG. 3, for example, at the tooth surface 115 of the workpiece gear 11 contacting a driving-side cutting tooth surface 215 (see FIG. 4) of the cutter 21, the shaving starts from a tooth surface portion 117 close to one end surface 111 of the workpiece gear 11, and the shaving region (processing region) gradually expands toward a tooth surface portion 118 close to the other end surface 112. Conversely, at a tooth surface 116 of the workpiece gear 11 contacting a driven-side cutting tooth surface 216 (see FIG. 4) of the cutter 21, the shaving starts from a tooth surface portion 118' close to the other end surface 112 of the workpiece gear 11, and the shaving region (processing region) gradually expands toward a tooth surface portion 117' close to the one end surface 111. Therefore, as shown in FIG. 6B, the load on the cutter 21 increases with an increase in the cut amount.

Furthermore, as shown in FIG. 3, at the tooth surface 115 of the workpiece gear 11 contacting the driving-side cutting tooth surface 215 (see FIG. 4) of the cutter 21, the tooth surface portion 117 close to the one end surface 111 of the workpiece gear 11 is shaved deeper than the tooth surface portion 118 close to the other end surface 112, and at the tooth surface 116 of the workpiece gear 11 contacting the driven-side cutting tooth surface 216 (see FIG. 4) of the cutter 21, for example, the tooth surface portion 118' close to the other end surface 112 of the workpiece gear 11 is shaved deeper than the tooth surface portion 117' close to the one end surface 111.

Note that as shown in FIG. 3, in the first shaving step, a maximum shaved amount of the deeply shaved tooth surface does not reach a final processing tooth surface (a tooth surface 119 after the second processing).

Next, the controller 40, in a state of stopping the driving of the cutter lifting and lowering motor 34 and maintaining the cutter 21 at the same position (the cutter position P2 in FIG. 6A), maintains the driving of the cutter rotating motor 32 and executes a first dwell for a predetermined time (from the time T2 to a time T3). As shown in FIG. 6B, during this first dwell, the load applied to the cutter 21 decreases.

Figure 6A:
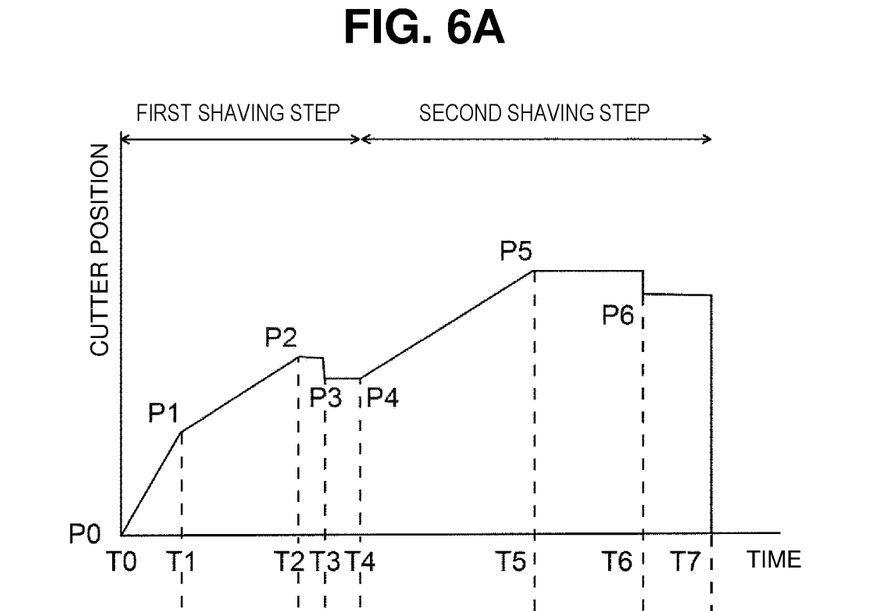
FIGS. 6A and 6B are graphs describing a relationship between a position of the cutter and a processing load in the shaving processing method of FIG. 3.
Figure 6B:
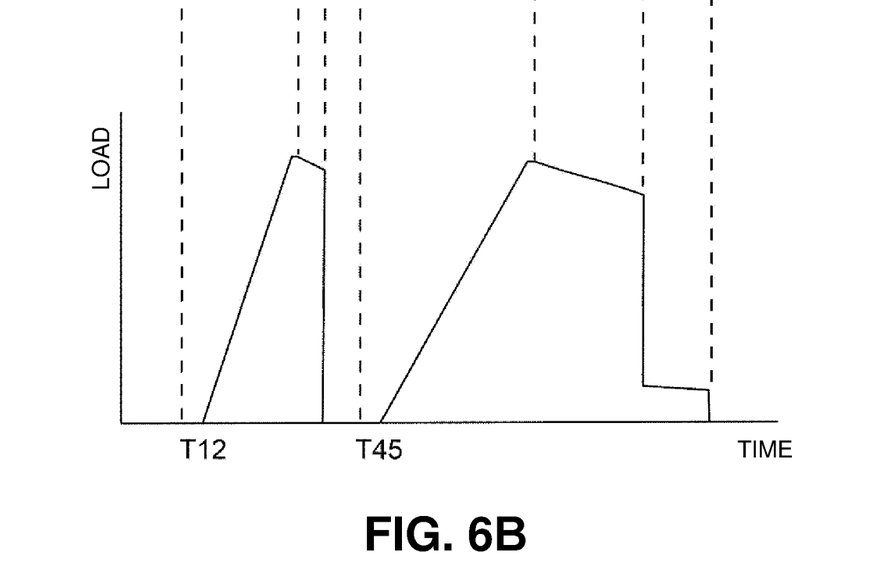

When the first dwell ends (the time T3 in FIG. 6A), the controller 40 drives the cutter lifting and lowering motor 34 to slightly retract the cutter 21 from the workpiece gear 11 (a cutter position P3 in FIG. 6A).

A state where the cutter 21 is retracted from the workpiece gear 11 is maintained for a predetermined time (from the time T3 to a time T4 in FIG. 6A). Meanwhile, the controller 40 drives the cutter turning motor 36 to set the intersection angle of the central axis 24 of the cutter supporting shaft 22 with respect to the central axis 14 of the gear supporting shaft 12 to the second intersection angle θ2 which is smaller than the first intersection angle θ1.

Second Shaving Step

Next, the second shaving step starts, and the controller 40, while driving the cutter rotating motor 32, drives the cutter lifting and lowering motor 34 (the time T4 and a cutter position P4 [=P3] in FIG. 6A) to cause the cutter 21 to approach the workpiece gear 11 and cause the cutting tooth 213 of the cutter 21 to abut against the tooth surface 115 of the workpiece gear 11, thereby shaving the tooth surface 115 of the workpiece gear 11. A time at which the cutter 21 contacts the workpiece gear 11 is a time T45 in FIG. 6B.

At this time, as shown in FIG. 3, for example, at the tooth surface 115 of the workpiece gear 11 contacting the driving-side cutting tooth surface 215 (see FIG. 4) of the cutter 21, the shaving starts from the tooth surface portion 118 close to the other end surface 112 of the workpiece gear 11, and the shaving region (processing region) gradually expands toward the tooth surface portion 117 close to the one end surface 111. Conversely, at the tooth surface 116 of the workpiece gear 11 contacting the driven-side cutting tooth surface 216 (see FIG. 4) of the cutter 21, the shaving starts from the tooth surface portion 117' close to the one end surface 112 of the workpiece gear 11, and the shaving region (processing region) gradually expands toward the tooth surface portion 118' close to the other end surface 111. Therefore, as shown in FIG. 6B, the load on the cutter 21 increases with an increase in the cut amount. This load applied to the cutter 21 becomes constant immediately before the shaving of the cutter 21 ends (a cutter position P5 in FIG. 6A).

Furthermore, as shown in FIG. 3, at the tooth surface 115 of the workpiece gear 11 contacting the driving-side cutting tooth surface 215 (see FIG. 4) of the cutter 21, the tooth surface portion 118 close to the other end surface 112 of the workpiece gear 11 is more shaved than the tooth surface portion 117 close to the one end surface 111, and the final tooth surface (the tooth surface after the second processing) 119 is completed. As shown in the drawing, in the final tooth surface 119, the tooth surface portion 117 close to the one end surface 111 of the workpiece gear 11 and the tooth surface portion 118 close to the other end surface 112 are shaved to the same degree, and the final tooth surface 119 is left-right symmetrical with respect to a midpoint between both the end surfaces 111 and 112.

When the final tooth surface 119 of the workpiece gear 11 is completed (a time T5 and the cutter position P5 in FIG. 6A), the controller 40 stops the driving of the cutter lifting and lowering motor 34.

During the second shaving step, the rotational direction of the cutter rotating motor 32 may be reversed. Thereby, left and right tooth surfaces of each of teeth of the workpiece gear 11 are processed more equally.

Next, the controller 40, while stopping the driving of the cutter lifting and lowering motor 34, maintains the driving of the cutter rotating motor 32 and starts a second dwell (the time T5 and the cutter position P5). The second dwell is continued for a predetermined time (from the time T5 to a time T6).

As required, the controller 40, while maintaining the driving of the cutter rotating motor 32, drives the cutter lifting and lowering motor 34 to slightly retract the cutter 21 from the workpiece gear 11 (the time T6 and a cutter position P6) and performs a third dwell. The third dwell is continued for a predetermined time (from the time T6 to a time T7).

Last, the controller 40 stops the driving of the cutter rotating motor 32 and drives the cutter lifting and lowering motor 34 to return the cutter 21 to the initial position (the time T7 and the cutter position P0).

Figure 7A:
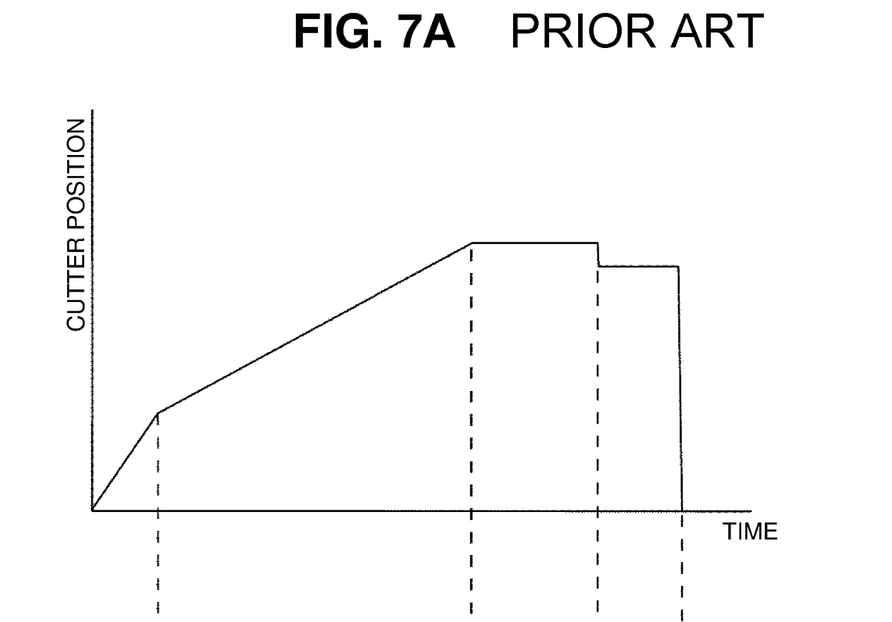
FIGS. 7A and 7B are graphs describing a relationship between a position of a cutter and a processing load in a conventional shaving processing method.
Figure 7B:
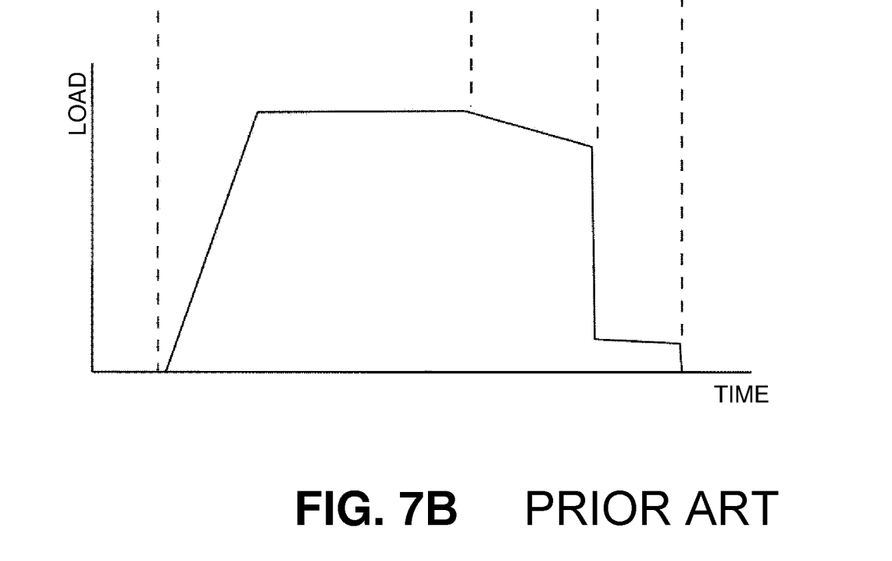

As described above, in the shaving apparatus and the shaving method according to the present embodiment, the shaving step is divided into the first shaving step and the second shaving step. In the first shaving step, the intersection angle between the gear central axis and the cutter central axis is set to the first intersection angle θ1 which is larger than the second intersection angle θ2 for final finishing and the predetermined amount of the shaving is performed, and in the subsequent second shaving step, the intersection angle is set to the second intersection angle θ2 for final finishing. Accordingly, in the first and second shaving steps, at each of the teeth of the workpiece gear, one tooth surface is gradually shaved from one end surface toward the other end surface, and the other tooth surface is gradually shaved from the other end surface toward the one end surface. Accordingly, as apparent from FIG. 6B, a load which the cutter receives through the shaving method of this embodiment is less than a load received by a cutter in a conventional shaving method (a method in which a relationship between a cut amount and a processing load is shown in FIGS. 7A-B) in which the intersection angle is set to an angle for final finishing (the above-described second intersection angle) and the entire tooth surface is uniformly shaved.

Figure 8:
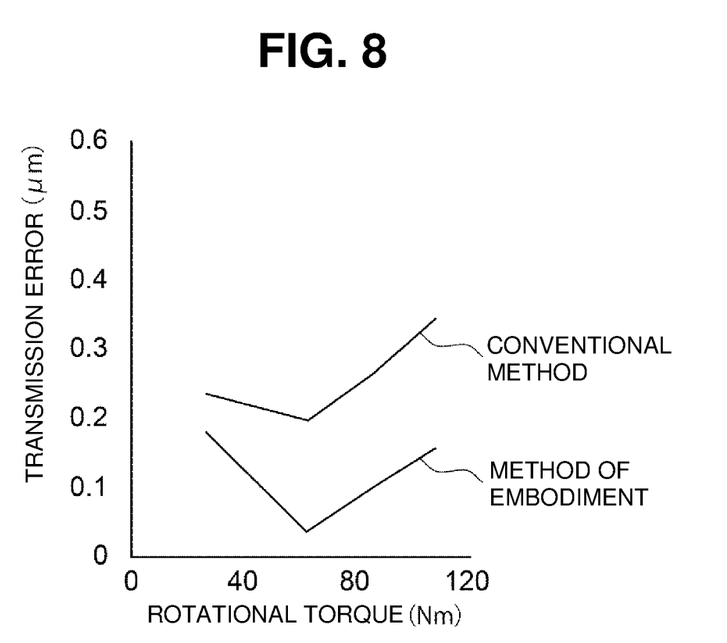
FIG. 8 is a graph of a transmission error of the gear obtained by the shaving processing method of FIG. 3.

Furthermore, since the load received by the cutter is reduced, as shown in FIG. 8, a transmission error of the gear processed by the shaving method according to this embodiment is smaller than a transmission error of a gear processed by the conventional shaving processing method. As a result, the gear processed by the shaving processing method of this embodiment has further more improved power transmission efficiency and durability than the gear processed by the conventional shaving processing method, reducing gear noise.

OTHER EMBODIMENTS

Figure 9A:
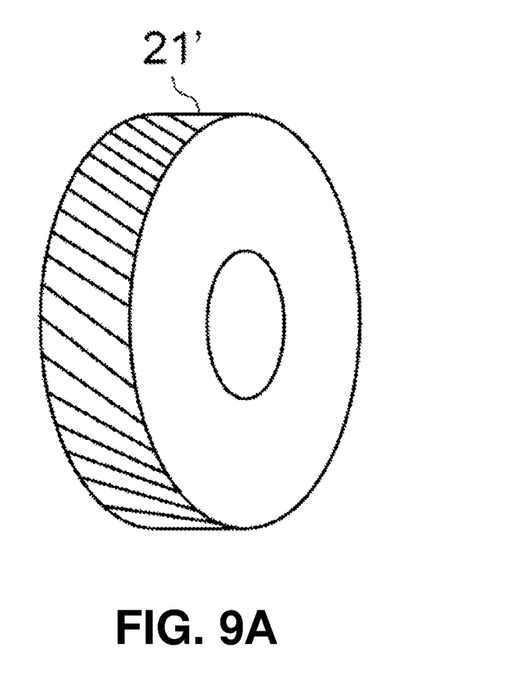
FIGS. 9A-9B are schematic views of the cutter used in a shaving processing method of another disclosed embodiment.
Figure 9B:
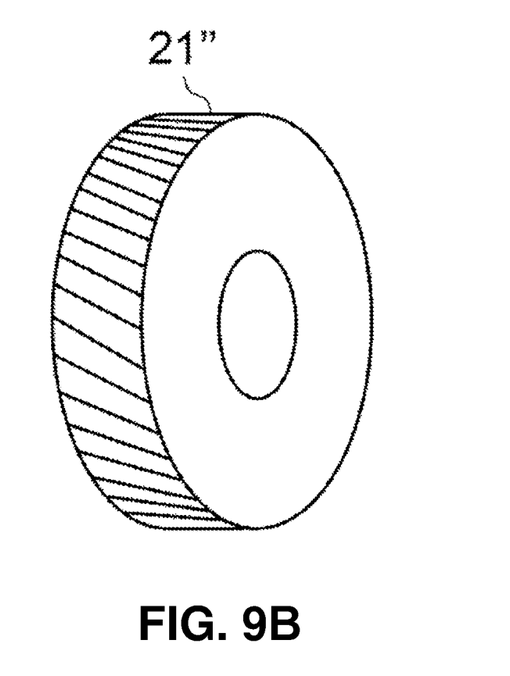

Although in the above description, the processing apparatus is provided with the intersection angle adjusting mechanism (cutter turning mechanism) and, by this, the intersection angle is adjusted, the intersection angle between the central axis of the workpiece gear supporting shaft and the central axis of the cutter supporting shaft may be maintained constant, and the cutters used in the first shaving step and the second shaving step may be switched. Furthermore, the first intersection angle may be set according to a torsion angle of a cutting tooth of a helical gear type cutter 21' (see FIG. 9A) used in the first shaving step, and the second intersection angle may be set according to a torsion angle of a cutting tooth of a helical gear type cutter 21" (see FIG. 9B) used in the second shaving step.

Furthermore, although in the above description, an embodiment is described in which the first intersection angle θ1 is set to be larger than the second intersection angle θ2, the first intersection angle may be set to be smaller than the second intersection angle. In this case, the tooth surface after the first processing in FIG. 3 inclines in a left and right reversed manner.

Furthermore, although in the above description, an embodiment is described in which the workpiece gear is a spur gear and the cutter is a helical gear type cutter, the present disclosure is also applicable to a processing apparatus and a processing method in which the workpiece gear is a helical gear and the cutter is a spur gear type cutter. Furthermore, the present disclosure is also applicable to a combination in which the workpiece gear is a helical gear and the cutter is a helical gear type cutter, or a combination of a workpiece gear of another shape and a cutter of another shape.

What is claimed is:

1. A shaving processing method for finishing a tooth surface of a gear in a state where the gear and at least a first shaving cutter are engaged with each other and the first shaving cutter is rotated, the gear comprising a circumference that extends around a central axis of the gear and connects a pair of end surfaces facing each other in a tooth width direction and spaced from each other in a direction of the central axis, the method comprising:
    performing a first shaving step of processing the tooth surface so that a radial dimension of a processing region of material being removed gradually gets smaller as machining performed by the first shaving cutter proceeds from one end surface of the pair of end surfaces toward the other end surface; and
    performing a second shaving step of processing the tooth surface so that a radial dimension of a processing region of material being removed gradually gets smaller as machining performed by either the first shaver cutter or a second shaving cutter proceeds from the other end surface of the pair of end surfaces toward the one end surface.

2. The shaving processing method according to claim 1, wherein
    an intersection angle between the central axis of the gear and a central axis of the first shaving cutter is set to a first intersection angle in the first shaving step, and an intersection angle between the central axis of the gear and the central axis of the first shaving cutter is set to a second intersection angle in the second shaving step,
    the first intersection angle is larger than the second intersection angle, and
    the second intersection angle corresponds to a finishing condition of the tooth surface.

3. The shaving processing method according to claim 2, wherein an intersection angle between a central axis of a shaft supporting the gear and a central axis of a shaft supporting the first shaving cutter is set to the first intersection angle in the first shaving step and is set to the second intersection angle in the second shaving step.

4. The shaving processing method according to claim 2, wherein the first shaving cutter is used for the second shaving step and a rotational direction of the first shaving cutter is switched to an opposite direction for the second shaving step.

5. The shaving processing method according to claim 1, wherein
   an intersection angle between the central axis of the gear and a central axis of the first shaving cutter is set to a first intersection angle in the first shaving step, and an intersection angle between the central axis of the gear and a central axis of the second shaving cutter is set to a second intersection angle in the second shaving step,
   in the first shaving step, the first shaving cutter is used and comprises a first cutting tooth extending in a direction corresponding to the first intersection angle, and
   in the second shaving step, the second shaving cutter is used and comprises a second cutting tooth extending in a direction corresponding to the second intersection angle.

6. The shaving processing method according to claim 1, wherein an intersection angle between a central axis of a shaft supporting the gear and a central axis of a shaft supporting the first shaving cutter is set to a first intersection angle in the first shaving step and is set to a second intersection angle in the second shaving step.

7. The shaving processing method according to claim 1, wherein
   in the first shaving step, the first shaving cutter is used and comprises a first cutting tooth extending in a direction corresponding to a first intersection angle between the central axis of the gear and a central axis of the first shaving cutter, and
   in the second shaving step, the second shaving cutter is used and comprises a second cutting tooth extending in a direction corresponding to a second intersection angle between the central axis of the gear and a central axis of the second shaving cutter.

8. The shaving processing method according to claim 1, wherein the first shaving cutter is used for the second shaving step and a rotational direction of the first shaving cutter is switched to an opposite direction for the second shaving step.

* * * * *